Jan. 24, 1961    T. W. ROBERTS    2,969,163
CATHODE-RAY TUBE ENVELOPE
Filed Aug. 9, 1957
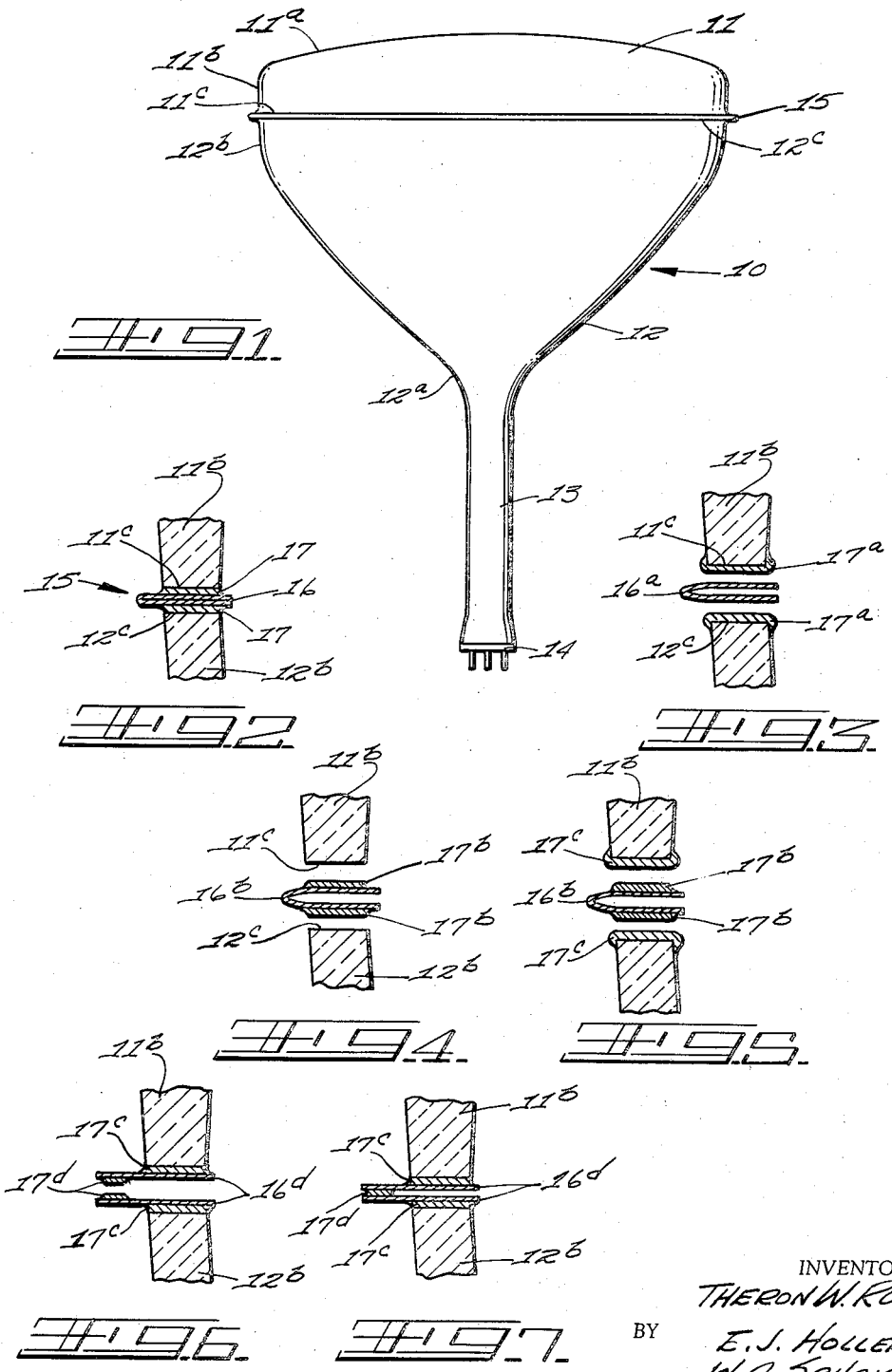
INVENTOR.
THERON W. ROBERTS
BY E. J. HOLLER &
W. A. SCHAICH
ATTORNEYS

United States Patent Office 2,969,163
Patented Jan. 24, 1961

2,969,163

CATHODE-RAY TUBE ENVELOPE

Theron W. Roberts, Toledo, Ohio, assignor to Owens-Illinois Glass Company, a corporation of Ohio Filed Aug. 9, 1957, Ser. No. 677,381

3 Claims. (Cl. 220—2.3)

The present invention relates to glass-to-metal seals wherein complementary annular sealing surfaces of two hollow glass parts such as the face plate and funnel members of a television picture tube envelope may be conjunctively joined with a ring-like metal strip utilizing a low-melting sealant.

In the subject invention the metal strip comprises a distinctively shaped metal band having sealing surfaces adaptable to providing a hermetic seal between the face plate and funnel parts and an outwardly extending flange portion readily susceptible to separation.

Glasses are normally sealed to metals and alloys by thermally softening the glass to near its melting point and contacting the softened glass with the metal part. In seals of this nature the expansion coefficients of the glass and metal must be substantially matched and particular precautions must be observed when the expansion coefficients are mismatched or dissimilar.

In the former type of seal the expansion coefficient of the glass between its setting point and ambient temperature is quite similar to that of the metal through the same temperature range so that differences in contraction of the glass and metal on cooling do not produce breaking stresses in the glass. Obviously, when the expansion coefficients of the dissimilar materials are properly matched, the thickness of the metal at the seal is relatively unimportant. However, when the expansion coefficients of the glass and metal are dissimilar, the thickness of the metal member at the seal is quite important, frequently requiring that the metal be very thin at the area of the seal to compensate for such mismatching.

Heretofore, the prior art has taught the employment of extremely thin individual metal bands which may be sealed to complemental glass sealing surfaces and subsequently joined by metal welding. Also, special alloys have been employed to achieve satisfactory matching of thermal properties of the glass and metal.

In the present invention two large hollow glass members such as the face plate and funnel parts of a television picture tube may be directly united utilizing a distinctively contoured unitary sealing member having a low-melting sealant for interpositioning between its sealing surfaces and those of the adjoining glass members. The unitary metal part which is employed in this invention to seal the large hollow glass parts is one having an essentially complementary contour to the glass sealing surfaces which metallic part is sufficiently flexible to compensate for stresses arising thereat on evacuation of the hollow bulb or tube and which may be readily opened by separation of an outwardly projecting annular area of the metal part.

Accordingly, it is a general object of the present invention to provide a hermetically sealed television picture tube envelope comprised primarily of preformed hollow glass parts sealed by a single folded metal ring inserted between the sealing surfaces of the glass parts at minimum temperatures to safeguard internal working electronic elements of the tube during final stages of tube processing.

Another object of the present invention is to provide a picture tube envelope which is readily susceptible to fabrication without metal welding but which possesses properties susceptible to reopening or subsequent reprocessing of the tube at minimized temperatures.

A further object of the present invention is to provide a television picture tube envelope which may be fabricated at minimum temperatures with avoidance of objectionable stresses and/or distortion in any of the working elements or parts of the tube.

The specific nature of this invention, as well as other objects and advantages thereof, will become apparent to those skilled in the art from the following detailed description, taken in conjunction with the annexed drawings, on which, by way of preferred example only, are illustrated the preferred embodiments of this invention.

The accompanying drawing illustrates on Fig. 1 a side elevation of a picture tube envelope embodying the principles of the present invention.

Fig. 2 is an enlarged fragmentary vertical sectional view of a preferred form of the seal area between the face plate and funnel parts of the picture tube envelope.

Fig. 3 is a view similar to Fig. 2 illustrating the components of the seal in disassembled relationship.

Fig. 4 is a view similar to Fig. 3 illustrating a modification of the seal components.

Fig. 5 is a view similar to Fig. 3 illustrating another modification of the seal components.

Fig. 6 is a view similar to Fig. 2 showing the reopened seal in disassembled relationship adaptable to resealing.

Fig. 7 is a view similar to Fig. 6 showing the reconstituted seal in assembled relationship.

While this invention will be described as specifically applied to the manufacture of a cathode-ray tube envelope, it will be apparent to those skilled in the art that the principles of the invention are equally applicable to the manufacture of any type of evacuated glass envelope formed by assembly of two or more preformed hollow glass parts.

The seal assembly may be effected without an optical quality polish being applied to the sealing surfaces although it may be preferred to apply a commercial polish to approximate a planar condition on one or both of the glass surfaces to be sealed.

A preferred embodiment consists of a cathode-ray tube envelope 10 consisting of a glass face plate 11, glass funnel 12 and neck tubulation 13 which is closed at its extremity by at least one beam gun 14. Face plate 11 consists of a curved viewing panel 11a bounded by a depending peripheral flange 11b which terminates in an annular sealing surface 11c. Funnel 12 has a generally frusto-conical shape which at its small end 12a is sealed to neck tubulation 13 and at its large open end 12b terminates in an annular sealing surface 12c. The sealing surfaces 11c and 12c are of complemental planar contour. The overall shape of the glass parts at the sealed area may be circular or rectangular as conventionally known in the art, with sealing surfaces 11c and 12c being relatively although not absolutely planar.

Face plate 11 and funnel 12 are sealed by a joint designated by numeral 15 which is illustrated in enlarged cross-section on Fig. 2. Ring 16 comprises an annular folded band of metal such as stainless steel having its folded region extending outwardly beyond the seal area. Metal band 16 has sealing surfaces which are wider than the glass sealing surfaces 11c and 12c. Layers 17 of a low-melting glass-to-metal sealing composition are utilized to bond metal ring 16 centrally between glass part sealing surfaces 11c and 12c.

Ring 16 may be fabricated of thin stainless steel sheet of approximately 0.005 inch in thickness for example, of considerably greater width than twice the width of the glass sealing edges. The contraction coefficient of the stainless steel or metallic alloy need only be in approximate agreement with the similar sealant layers 17. The sealant should have contraction properties compatible with both the glass and metal parts. Fig. 2 illustrates the joint 15 in finally assembled relationship. Ring 16 is fabricated to the similar contour of the sealing edges 11c and 12c with its ends joined by welding.

On Fig. 3 a newly-fabricated ring 16a is illustrated centrally disposed in the seal area with the parts disassembled. Layers 17a of similar sealing composition are adhered to the glass sealing surfaces 11c and 12c prior to contacting the parts 11 and 12 in alignment for effecting the seal shown on Fig. 2. In this modification ring 16a is fabricated as an inwardly unitary ring member unflattened until its interpositioning within the seal area. The sealing composition is adhered to the full glass sealing surfaces 11c and 12c respectively, subsequent to the fabrication of prefabricated glass parts 11 and 12. The sealing composition is then thermally softened at a temperature not in excess of about 540° C. and the parts contacted in proper arrangement to consummate the durable hermetic seal. The sealing composition is softened to an extent to fully wet both the glass and metal sealing surfaces prior to contacting the parts. Examples of the sealing composition have been fully disclosed in the copending patent applications of Francl and Hagedorn, Serial No. 481,008, filed January 10, 1955, now abandoned, entitled "Low Temperature Glass Sealing Composition" and Billian and Hagedorn, Serial No. 658,015, filed May 9, 1957, entitled "Devitrifiable Glass Sealing Composition."

In another modification of joining the component parts as shown on Fig. 4, layers 17b of sealing composition are adhered to the metal sealing surfaces of folded ring 17b prior to its juxtapositioning within the seal area. Ring 16b thus carries the sealant independent of the glass parts and the glass and metal parts may be assembled in final relationship with or without commercial grinding or polishing of the uncoated glass sealing surfaces 11c and/or 12c.

In still another modification of the invention as shown on Fig. 5, the coated sealing ring 16b is interposed between preformed glass parts carrying thin layers 17c of similar sealing composition. Thus, the glass and metal parts are joined by contacting the laminated layers of softened similar sealing material to effect the seal at minimized temperatures. The adhered layers of the sealant having like characteristics are readily bonded to each other to expeditiously effect a durable vacuum-tight seal between the face plate and funnel members.

Joint 15 is comprised of a sandwiched glass-to-metal seal formed by a U-shaped member capable of being flattened on joinder of the parts. The metal sealing ring 16 having an outwardly extending folded portion may be separated by severing the ring along an annular line coincidental with its fold. Should any of the internal elements of the tube be determined to be misaligned or producing malfunction of the tube, the joint 15 may be quickly opened by externally severing the metal member only without disturbance of the primary glass-to-metal seal. Thus, the tube is capable of being opened without producing distortion or deformation of the sealed glass-to-metal members and without any elevation in temperature of the sealed joint.

In order to reestablish the seal after rectification of any interior deficiencies within the tube envelope, the separated parts may again be juxtapositioned as shown on Fig. 6 with thin annular layers 17d of sealing composition adhered to the external oppositely disposed edges of the divided metal rings 16d. The divided rings 16d are then reunited by contacting the opposing layers 17d of sealing compositions in heat softened condition to again create a hermetic seal between the face plate and funnel members. As shown on Fig. 7 the peripherally joined metal rings 16d are illustrated prior to their being pressed together in contacting relationship by evacuation of the tube.

The extremities of the metal rings may also be united by brazing or soldering or welding providing that the metal to parent glass seals are not overheated. The reestablished seal is as hermetically durable as the original seal. The resealing may be accomplished without the creation of stresses in the parent glass because the original seal between the parent glass and metal bands is not disturbed by resealing of the envelope. The resealed area lies externally beyond the parent glass parts and may be acted upon without thermal distortion or deformation of the primary glass-to-metal seal area.

It will, of course, be understood that various details of construction or sealing procedure may be modified through a wide range without departing from the principles of this invention, and it is, therefore, not the purpose to limit the patent granted hereon otherwise than necessitated by the scope of the appended claims.

I claim:

1. A cathode-ray tube envelope comprising essentially two hollow glass parts consisting of face plate and funnel members, said glass parts having complementary annular substantially planar sealing surfaces disposed in juxtaposed relation facing one another, a unitary annular metallic ring member having a flattened U-shaped cross-section disposed between and complementary to the contour of the sealing surfaces of said glass parts, said ring member comprising a folded twin-ply annular band of metallic alloy having at least slightly greater width than said glass sealing surfaces, each ply of said band having a uniform thickness of about 0.005 inch and a thermal contraction coefficient in substantial agreement with said glass parts, and at least two continuous annular layers of low-melting initially-vitreous sealant interposed between the opposing glass and metallic sealing surfaces in thermally fused relation.

2. A cathode-ray tube envelope in accordance with claim 1, wherein the base portion of said flattened U-shaped metallic ring member projects outwardly radially beyond the sealing surfaces of said glass and metallic members, said metallic ring member being comprised of stainless steel alloy.

3. A cathode-ray tube envelope in accordance with claim 1, wherein said low-melting initially-vitreous sealant comprises a glass-to-metal sealing composition having a softening point temperature not in excess of 540° C. and a thermal contraction coefficient in substantial agreement with said glass and metallic members.

References Cited in the file of this patent

UNITED STATES PATENTS

| | | |
|---|---|---|
| 2,643,020 | Dalton | June 23, 1953 |
| 2,708,774 | Seelen | May 24, 1955 |
| 2,824,989 | Christofferson | Feb. 25, 1958 |